(12) United States Patent
Tomari et al.

(10) Patent No.: US 6,786,314 B2
(45) Date of Patent: *Sep. 7, 2004

(54) ELECTROMAGNETIC CLUTCH STRUCTURE IN DRIVING FORCE DISTRIBUTION SYSTEM

(75) Inventors: Tatsuhiro Tomari, Wako (JP); Akihiro Iwazaki, Wako (JP); Masakatsu Hori, Wako (JP); Kazuhiro Wada, Wako (JP)

(73) Assignee: Honda Giken Kogyo Kabushiki Kaisha, Toyko (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/041,586

(22) Filed: Jan. 10, 2002

(65) Prior Publication Data

US 2002/0130008 A1 Sep. 19, 2002

(30) Foreign Application Priority Data

Jan. 12, 2001 (JP) ...................................... 2001-004803

(51) Int. Cl.⁷ .............................................. F16D 27/12
(52) U.S. Cl. ...................... 192/48.2; 192/49; 192/84.91
(58) Field of Search ....................... 192/48.2, 49, 84.21

(56) References Cited

U.S. PATENT DOCUMENTS

| | | | | |
|---|---|---|---|---|
| 3,455,419 A | * | 7/1969 | Miquel | 188/164 |
| 3,675,747 A | * | 7/1972 | Obermark | 192/84.21 |
| 5,545,103 A | * | 8/1996 | Gustin | 475/223 |
| 6,012,560 A | * | 1/2000 | Kuroda et al. | 192/35 |
| 6,637,572 B2 | * | 10/2003 | Tomari et al. | 192/48.2 |
| 2001/0035324 A1 | * | 11/2001 | Okuma et al. | 192/48.2 |
| 2002/0100654 A1 | * | 8/2002 | Tomari et al. | 192/48.2 |

FOREIGN PATENT DOCUMENTS

JP          59-166725 A  *  9/1984  ........... F16D/27/12

* cited by examiner

Primary Examiner—Richard M. Lorence
(74) Attorney, Agent, or Firm—Arent Fox PLLC (57) ABSTRACT

A driving force distribution system selectively operates right and left electromagnetic clutches and, thereby assisting a vehicle in turning by transmitting torque from the inner turning wheel to the outer turning wheel. The right electromagnetic clutch includes an armature on the right side of a core housing a coil. The left electromagnetic clutch includes an armature on the left side of the core housing a coil. When the right electromagnetic clutch is engaged in order to assist the turning by transmitting torque from the right driven wheel to the left driven wheel when the vehicle is turning right, since the right electromagnetic clutch includes the armature on the right side of the core, the armature is urged leftward toward the core due to a centrifugal force caused by turning right to reduce an air gap, thereby enhancing the responsiveness of engagement of the right electromagnetic clutch as well as reducing the power consumption.

12 Claims, 7 Drawing Sheets

ELECTROMAGNETIC CLUTCH STRUCTURE IN DRIVING FORCE DISTRIBUTION SYSTEM

BACKGROUND OF THE INVENTION

1. Technical Field

The present invention relates to a driving force distribution system that transmits torque between right and left driven wheels by selectively operating two electromagnetic clutches and, in particular, to the structures of the electromagnetic clutches.

2. Description of the Related Art

There is a known technique that enhances turning performance where the engine torque can be distributed between right and left driven wheels via a driving force distribution system that includes two clutches, and the torque distributed to the outer turning wheel is increased while decreasing the torque distributed to the inner turning wheel thereby generating a yaw moment in the turning direction. With regard to such a driving force distribution system, one in which the above-mentioned two clutches are formed from electromagnetic clutches has already been proposed by the present applicant (ref. Japanese Patent Application No. 11-293467).

In the above-mentioned electromagnetic clutches, excitation of a coil attracts an armature toward a core so that the attracted armature effects engagement between clutch discs and clutch plates, and when the electromagnetic clutch is in a disengaged state where the coil is not excited, an air gap is formed between the core and the armature. When a vehicle is turning, one of the right and left electromagnetic clutches is engaged. In the above-mentioned arrangement, since the armature of the electromagnetic clutch that is to be engaged is urged in the direction in which it departs from the core due to a centrifugal force accompanying the turn, the air gap increases. As a result, the time lag from exciting the coil to attracting the armature increases, and there is a possibility that the responsiveness of engagement of the electromagnetic clutch might be degraded and that the power consumption of the electromagnetic clutch might increase.

The present invention has been carried out in view of the above-mentioned circumstances, and it is an object of the present invention to counteract the influence of the centrifugal force accompanying the turning of the vehicle on the operation of the electromagnetic clutches in a driving force distribution system that includes two electromagnetic clutches.

In order to achieve the above-mentioned object, there is proposed an electromagnetic clutch structure in a driving force distribution system that includes a first electromagnetic clutch that transmits torque from a right output shaft connected to a right driven wheel to a left output shaft connected to a left driven wheel, and a second electromagnetic clutch that transmits torque from the left output shaft connected to the left driven wheel to the right output shaft connected to the right driven wheel, selective operation of the first and second electromagnetic clutches transmitting torque from the output shaft that is on the inside of a turn to the output shaft that is on the outside of the turn, wherein the first electromagnetic clutch includes an armature placed on the right side of a core housing a coil, and wherein the second electromagnetic clutch includes an armature placed on the left side of the core housing a coil.

In accordance with the above-mentioned arrangement, when a vehicle turns right, the first electromagnetic clutch is engaged so as to assist the turn by transmitting torque from the right driven wheel that is on the inside of the turn to the left driven wheel that is on the outside of the turn. Since the first electromagnetic clutch is provided with the armature on the right side of the core housing the coil, the armature is urged leftward due to a centrifugal force caused by turning right to reduce an air gap, thereby enhancing the responsiveness of engagement of the first electromagnetic clutch as well as reducing the power consumption. When the vehicle turns left, the second electromagnetic clutch is engaged so as to assist the turn by transmitting torque from the left driven wheel that is on the inside of the turn to the right driven wheel that is on the outside of the turn. Since the second electromagnetic clutch is provided with the armature on the left side of the core housing the coil, the armature is urged rightward due to a centrifugal force caused by turning left to reduce an air gap, thereby enhancing the responsiveness of engagement of the second electromagnetic clutch as well as reducing the power consumption.

Furthermore, in accordance with the invention, there is proposed an electromagnetic clutch structure in a driving force distribution system that includes a first electromagnetic clutch that transmits torque from a right output shaft connected to a right driven wheel to a left output shaft connected to a left driven wheel, and a second electromagnetic clutch that transmits torque from the left output shaft connected to the left driven wheel to the right output shaft connected to the right driven wheel, selective operation of the first and second electromagnetic clutches transmitting torque from the output shaft that is on the outside of a turn to the output shaft that is on the inside of the turn, wherein the first electromagnetic clutch includes an armature placed on the left side of a core housing a coil, and wherein the second electromagnetic clutch includes an armature placed on the right side of a core housing a coil.

In accordance with the above-mentioned arrangement, when a vehicle turns right, the second electromagnetic clutch is engaged so as to stabilize the vehicle behavior by transmitting torque from the left driven wheel that is on the outside of the turn to the right driven wheel that is on the inside of the turn. Since the second electromagnetic clutch is provided with the armature on the right side of the core housing the coil, the armature is urged leftward due to a centrifugal force caused by turning right to reduce an air gap, thereby enhancing the responsiveness of engagement of the second electromagnetic clutch as well as reducing the power consumption. When the vehicle turns left, the first electromagnetic clutch is engaged so as to stabilize the vehicle behavior by transmitting torque from the right driven wheel that is on the outside of the turn to the left driven wheel that is on the inside of the turn. Since the first electromagnetic clutch is provided with the armature on the left side of the core housing the coil, the armature is urged rightward due to a centrifugal force caused by turning left to reduce an air gap, thereby enhancing the responsiveness of engagement of the first electromagnetic clutch as well as reducing the power consumption.

The first electromagnetic clutch and the second electromagnetic clutch of the present invention correspond to a right electromagnetic clutch CR and a left electromagnetic clutch CL respectively of the embodiments below.

Modes for carrying out the present invention are described below by reference to embodiments of the present invention shown in the appended drawings.

BRIEF DESCRIPTION OF DRAWINGS

FIGS. 1 to 4 illustrate a first embodiment of the present invention.

Figure 1:
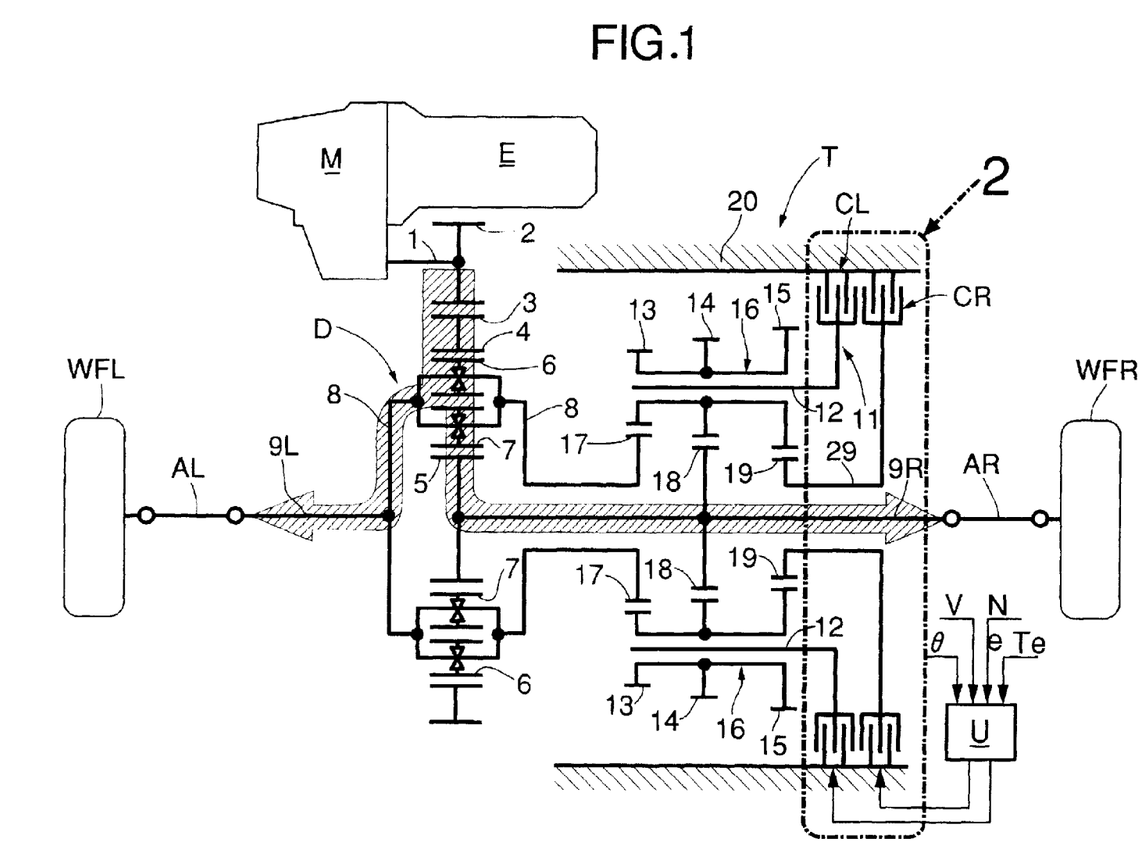
FIG. 1 is a diagram showing the structure of a driving force distribution system.

As shown in FIG. 1, a transmission M is connected to the left end of an engine E, which is transversely mounted in the front part of a vehicle body of a front-engined/front-wheel drive vehicle, and a driving force distribution system T is disposed to the rear of the engine E and the transmission M. A front right wheel WFR and a front left wheel WFL are connected to a right drive shaft AR and a left drive shaft AL respectively, which extend laterally from the right end and the left end of the driving force distribution system T.

The driving force distribution system T includes a differential D to which the driving force is transmitted from an externally-toothed gear 3 meshing with an input gear 2 provided on an input shaft 1 extending from the transmission M. The differential D employs a double pinion type planetary gear mechanism and includes a ring gear 4; a sun gear 5; and a planetary carrier 8 supporting an outer planetary gear 6 and an inner planetary gear 7 in a state in which the gears are meshed with each other. The ring gear 4 is integrally formed with the above-mentioned externally-toothed gear 3. The sun gear 5 is disposed coaxially within the ring gear 4. The outer planetary gear 6 meshes with the above-mentioned ring gear 4 and the inner planetary gear 7 meshes with the above-mentioned sun gear 5. In the differential D the ring gear 4 functions as an input element while the sun gear 5, which functions as one of the output elements, is connected to the front right wheel WFR via a right output shaft 9R. The planetary carrier 8, which functions as the other of the output elements, is connected to the front left wheel WFL via a left output shaft 9L.

A carrier member 11 rotatably supported on the outer circumference of the right output shaft 9R is provided with four pinion shafts 12 (only two are shown) disposed at 90° intervals in the circumferential direction, and each pinion shaft 12 rotatably supports a triple pinion member 16 in which a first pinion 13, a second pinion 14 and a third pinion 15 are integrally formed.

Rotatably supported on the outer circumference of the right output shaft 9R is a first sun gear 17, which meshes with the above-mentioned first pinion 13 and is linked to the planetary carrier 8 of the differential D. A second sun gear 18 fixed to the outer circumference of the right output shaft 9R meshes with the above-mentioned second pinion 14. Furthermore, a third sun gear 19 rotatably supported on the outer circumference of the right output shaft 9R meshes with the above-mentioned third pinion 15.

The numbers of teeth on the first pinion 13, the second pinion 14, the third pinion 15, the first sun gear 17, the second sun gear 18, and the third sun gear 19 in the embodiments are as follows.

Number of teeth on the first pinion 13 $Z_b=17$

Number of teeth on the second pinion 14 $Z_d=17$

Number of teeth on the third pinion 15 $Z_f=34$

Number of teeth on the first sun gear 17 $Z_a=32$

Number of teeth on the second sun gear 18 $Z_c=28$

Number of teeth on the third sun gear 19 $Z_e=32$

The third sun gear 19 can be connected to a housing 20 via a right electromagnetic clutch CR, and the rotational speed of the carrier member 11 is increased by engagement of the right electromagnetic clutch CR. The carrier member 11 can be connected to the housing 20 via a left electromagnetic clutch CL, and the rotational speed of the carrier member 11 is reduced by engagement of the left electromagnetic clutch CL. The above-mentioned right electromagnetic clutch CR and left electromagnetic clutch CL are controlled by an electronic control unit U that includes a microcomputer.

The electronic control unit U processes the engine torque Te, the engine rotational speed Ne, the vehicle speed V, and the steering angle $\theta$ based on a predetermined program, thereby controlling the above-mentioned right electromagnetic clutch CR and left electromagnetic clutch CL.

Figure 2:
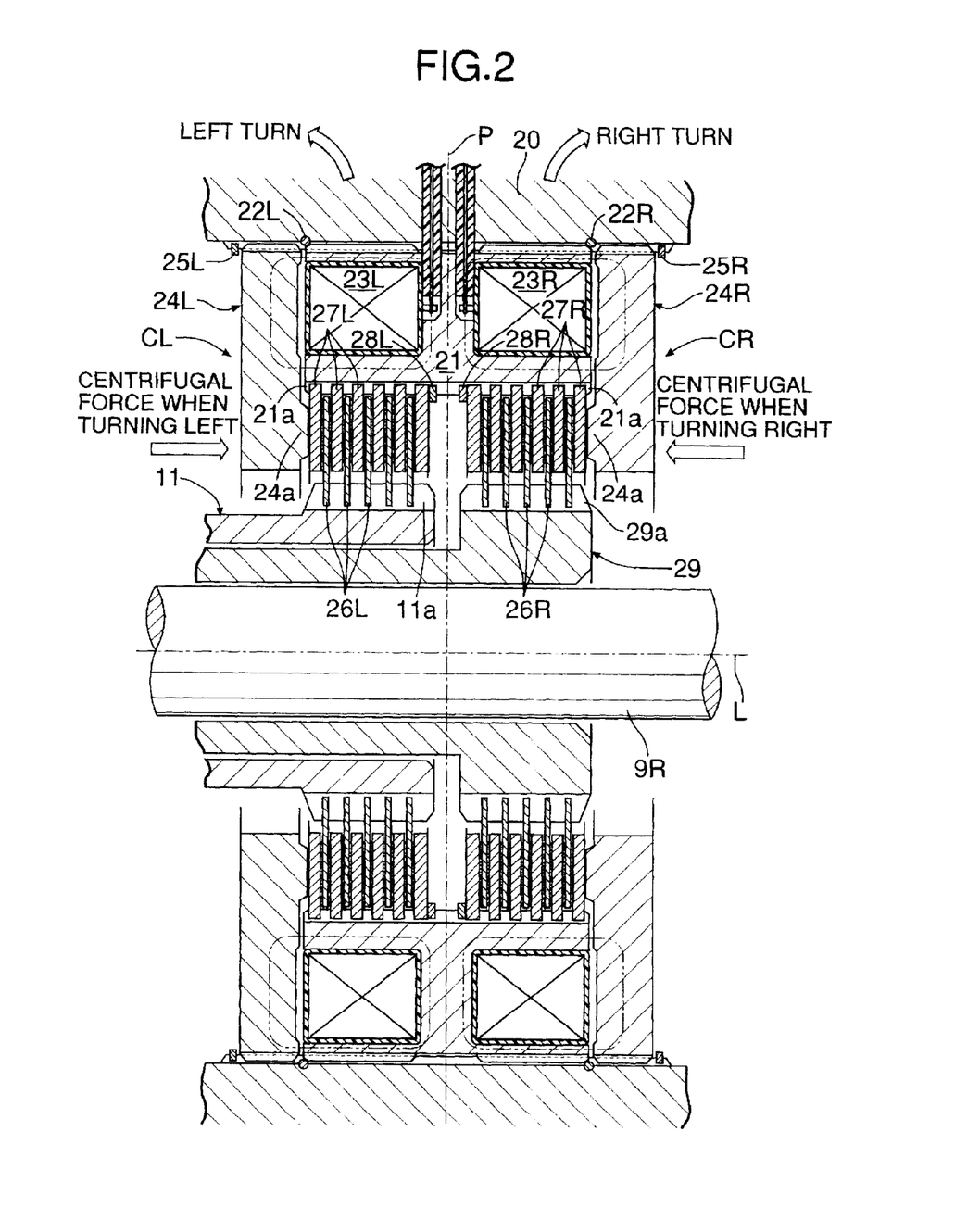
FIG. 2 is a magnified view of part 2 in FIG. 1.

Next, the structure of the right and left electromagnetic clutches CR and CL is explained by reference to FIG. 2. The right and left electromagnetic clutches CR and CL have substantially symmetrical structures relative to a plane of symmetry P that is orthogonal to the axis L of the right and left output shafts 9R and 9L. The reference symbols of components forming the right electromagnetic clutch CR are denoted by changing, to 'R', the 'L' of the reference symbols of components forming the left electromagnetic clutch CL.

The right and left electromagnetic clutches CR and CL, which are housed within the housing 20 made of a non-magnetic material such as an aluminum alloy, are provided with a common core 21 made of a magnetic material in a substantially cylindrical form. The core 21 is spline-coupled to the inner circumference of the housing 20 in a non-rotatable manner and fixed by a pair of clips 22R and 22L in an axially (laterally) immovable manner. A left coil 23L is housed in the left end part of the core 21. A left armature 24L made of a magnetic material in an annular form is spline-coupled to the inner circumference of the housing 20 in a laterally movable manner so as to directly face the left end face of the coil 23L and is prevented from falling out by a clip 25L. A right coil 23R is housed in the right end part of the core 21. A right armature 24R made of a magnetic material in an annular form is spline-coupled to the inner circumference of the housing 20 in a laterally movable manner so as to directly face the right end face of the coil 23R and is prevented from falling out by a clip 25R.

The outer circumference of the right end part of the carrier member 11 faces the inner circumference of the left half of the core 21 across a gap. A plurality of clutch discs 26L coupled to a spline 11a formed on the outer circumference of the carrier member 11 and a plurality of clutch plates 27L coupled to a spline 21a formed on the inner circumference of the core 21 are alternately superimposed. The clutch plate 27L positioned on the leftmost side faces a pressure part 24a of the armature 24L, the pressure part 24a extending further toward the axis L side than the radially inner end of the core 21. The clutch plate 27L positioned on the rightmost side is retained on the core 21 by a clip 28L.

A sleeve 29 that is integral with the third sun gear 19 (see FIG. 1) is coaxially and relatively rotatably fitted around the outer circumference of the right output shaft 9R. The outer circumference of the right end part of the sleeve 29 faces the inner circumference of the right half of the core 21 across a gap. A plurality of clutch discs 26R coupled to a spline 29a formed on the outer circumference of the sleeve 29 and a plurality of clutch plates 27R coupled to the spline 21a formed on the inner circumference of the core 21 are alternately superimposed. The clutch plate 27R positioned on the rightmost side faces a pressure part 24a of the armature 24R, the pressure part 24a extending further toward the axis L side than the radially inner end of the core 21. The clutch plate 27R positioned on the leftmost side is retained on the core 21 by a clip 28R.

Figure 3:
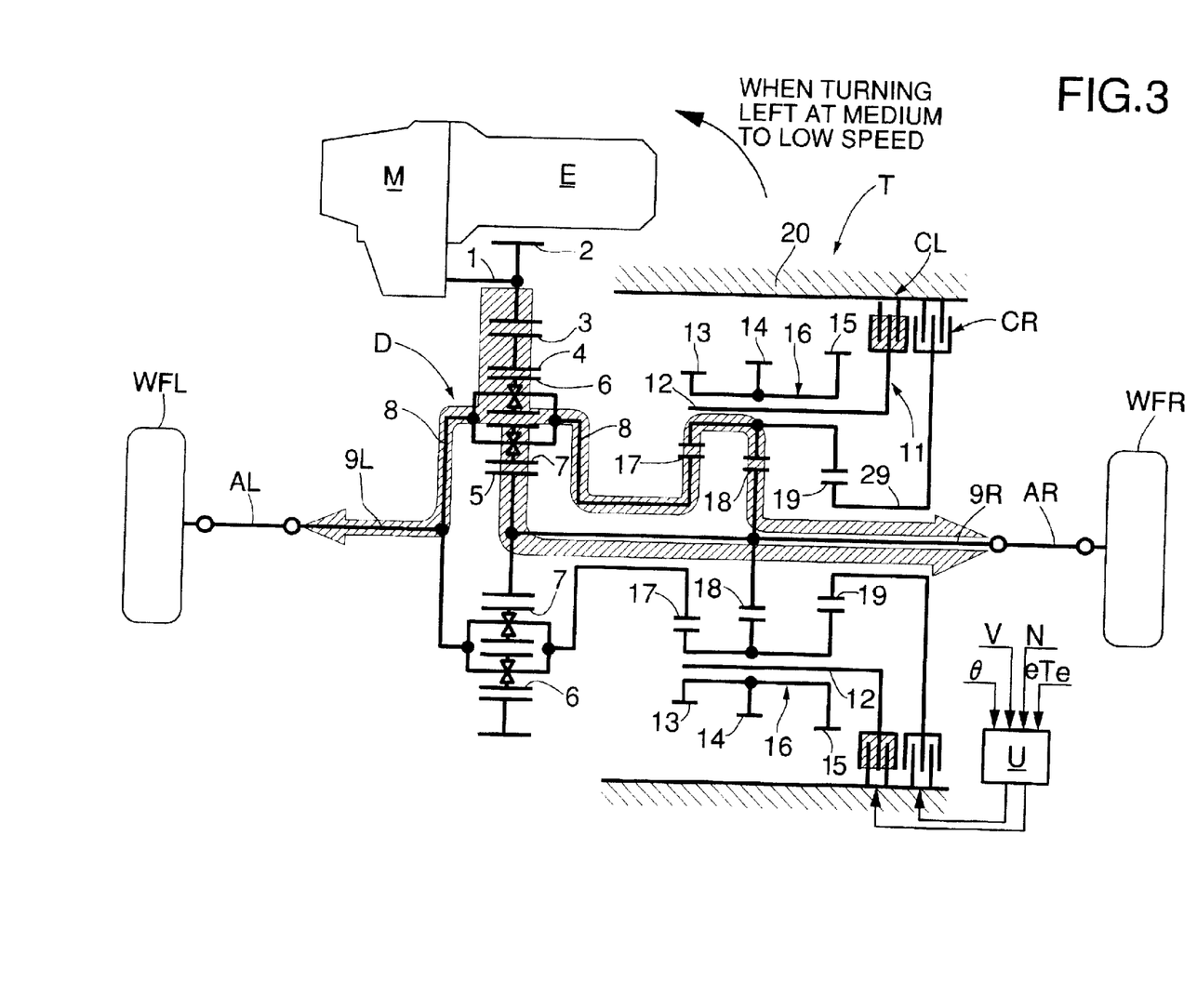
FIG. 3 is a diagram showing the action of the driving force distribution system when the vehicle is turning left at a medium to low speed.

When the vehicle is turning left at a medium to low speed, as shown in FIG. 3 the coil 23L is energized by a command from the electronic control unit U, thereby engaging the left electromagnetic clutch CL. As a result, a magnetic flux is generated along a closed magnetic path running through the core 21 and the armature 24L, which are made of a magnetic material. The armature 24L is thereby attracted to the right in the Figure, toward the core 21, thus pressing the clutch plates 27L and the clutch discs 26L into close contact with each other. The carrier member 11 is thereby connected to the housing 20 via the core 21 and stops rotating. At this time, since the right output shaft 9R, which is integral with the front right wheel WFR, and the left output shaft 9L, which is integral with the front left wheel WFL, (that is to say, the planetary carrier 8 of the differential D) are linked via the second sun gear 18, the second pinion 14, the first pinion 13, and the first sun gear 17, the rotational speed NR of the front right wheel WFR is increased relative to the rotational speed NL of the front left wheel WFL according to the relationship shown in the equation below.

$$NR/NL = (Zd/Zc) \times (Za/Zb) \quad (1)$$
$$= 1.143$$

When the rotational speed NR of the front right wheel WFR is increased relative to the rotational speed NL of the front left wheel WFL as above-mentioned, a proportion of the torque of the front left wheel WFL, which is the inner turning wheel, can be transmitted to the front right wheel WFR, which is the outer turning wheel, as shown by the hatched arrows in FIG. 3. It is thus possible to enhance the turning performance by assisting the vehicle in turning left. As hereinbefore described, when the left electromagnetic clutch CL is engaged, the armature 24L of the left electromagnetic clutch CL is urged rightward, which is to the outside of the turn, due to the centrifugal force caused by turning left. This reduces the air gap between the armature 24L and the core 21 in advance, thereby not only enhancing the responsiveness of engagement of the left electromagnetic clutch CL but also reducing the power consumption.

If, instead of stopping the carrier member 11 by means of the left electromagnetic clutch CL, the rotational speed of the carrier member 11 is reduced by appropriately adjusting the engagement force of the left electromagnetic clutch CL, the rotational speed NR of the front right wheel WFR can be increased relative to the rotational speed NL of the front left wheel WFL in accordance with the reduction, and any required level of torque can be transmitted from the front left wheel WFL, which is the inner turning wheel, to the front right wheel WFR, which is the outer turning wheel.

Figure 4:
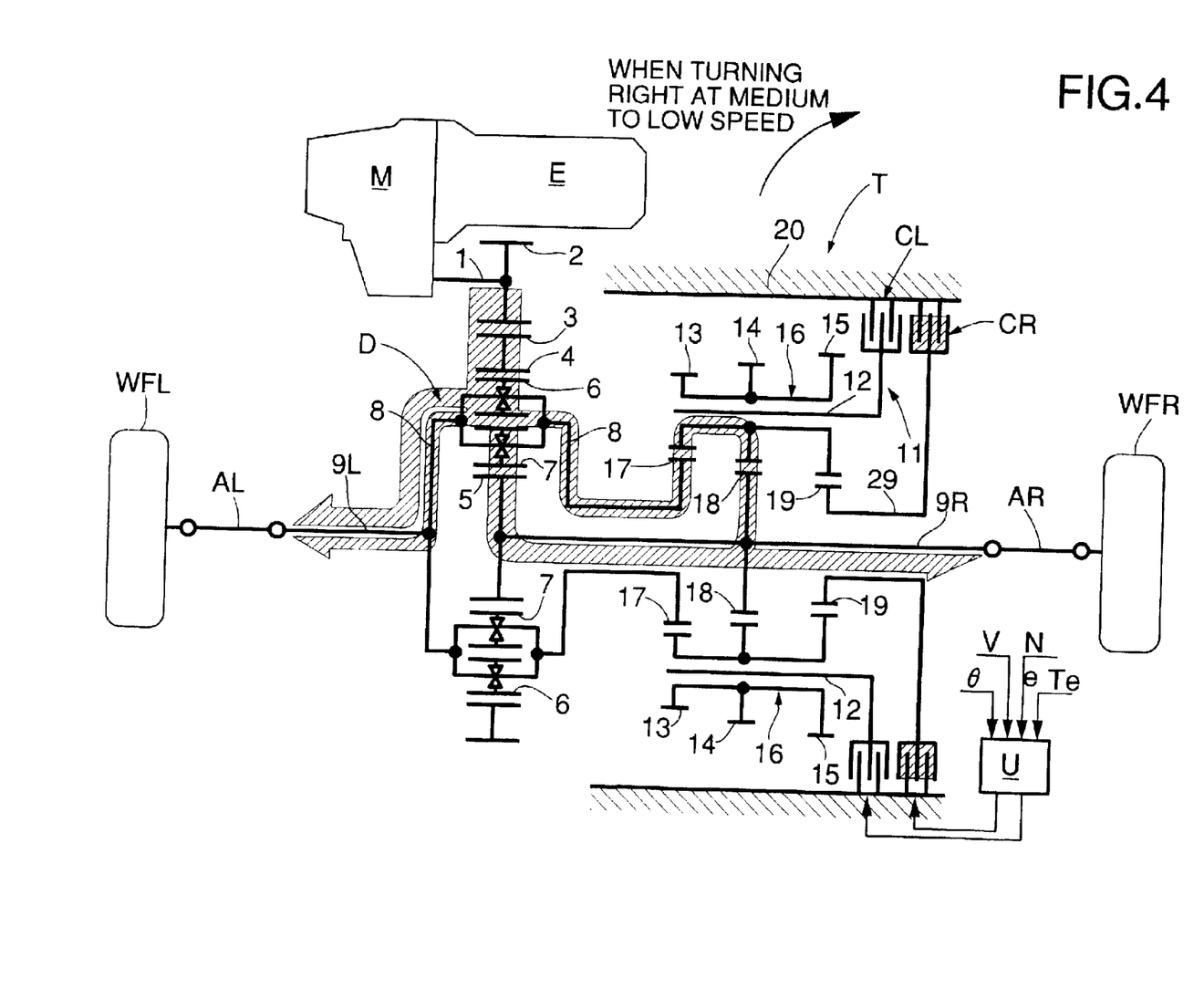
FIG. 4 is a diagram showing the action of the driving force distribution system when the vehicle is turning right at a medium to low speed.

On the other hand, when the vehicle is turning right at a medium to low speed, as shown in FIG. 4 the coil 23R is energized by a command from the electronic control unit U, thereby engaging the right electromagnetic clutch CR. As a result, a magnetic flux is generated along a closed magnetic path running through the core 21 and the armature 24R, which are made of a magnetic material. The armature 24R is thereby attracted to the left in the Figure, toward the core 21, thus pressing the clutch plates 27R and the clutch discs 26R into close contact with each other. The sleeve 29 is thereby connected to the housing 20 via the core 21 and stops rotating. As a result, the third pinion 15 connected to the sleeve 29 via the third sun gear 19 also stops rotating, the rotational speed of the carrier member 11 is increased relative to the rotational speed of the output shaft 9R, and the rotational speed NL of the front left wheel WFL is increased relative to the rotational speed NR of the front right wheel WFR in accordance with the relationship shown in the equation below.

$$NL/NR = \{1 - (Ze/Zf) \times (Zb/Za)\} \div \{1 - (Ze/Zf) \times (Zd/Zc)\} \quad (2)$$
$$= 1.167$$

As described above, when the rotational speed NL of the front left wheel WFL increases relative to the rotational speed NR of the front right wheel WFR, a proportion of the torque of the front right wheel WFR, which is the inner turning wheel, can be transmitted to the front left wheel WFL, which is the outer turning wheel, as shown by the hatched arrows in FIG. 4. Also in this case, if the rotational speed of the carrier member 11 is increased by appropriately adjusting the engagement force of the right electromagnetic clutch CR, the rotational speed NL of the front left wheel WFL can be increased relative to the rotational speed NR of the front right wheel WFR in accordance with the increase, and any required level of torque can be transmitted from the front right wheel WFR, which is the inner turning wheel, to the front left wheel WFL, which is the outer turning wheel. It is thus possible to enhance the turning performance by assisting the vehicle in turning right. As hereinbefore described, when the right electromagnetic clutch CR is engaged, the armature 24R of the right electromagnetic clutch CR is urged leftward, which is to the outside of the turn, due to the centrifugal force caused by turning right. This reduces the air gap between the armature 24R and the core 21 in advance, thereby not only enhancing the responsiveness of engagement of the right electromagnetic clutch CR but also reducing the power consumption.

Also in this case, if, instead of stopping the sleeve 29 by means of the right electromagnetic clutch CR, the rotational speed of the sleeve 29 is reduced by appropriately adjusting the engagement force of the right electromagnetic clutch CR, the rotational speed NL of the front left wheel WFL can be increased relative to the rotational speed NR of the front right wheel WFR in accordance with the reduction, and any required level of torque can be transmitted from the front right wheel WFR, which is the inner turning wheel, to the front left wheel WFL, which is the outer turning wheel.

As is clear from a comparison of equation (1) with equation (2), since the numbers of teeth of the first pinion 13, the second pinion 14, the third pinion 15, the first sun gear 17, the second sun gear 18 and the third sun gear 19 are set as above-mentioned, the percentage increase in rotational speed (about 1.143) of the front right wheel WFR over the front left wheel WFL can be made substantially equal to the percentage increase in rotational speed (about 1.167) of the front left wheel WFL over the front right wheel WFR.

Figure 5:
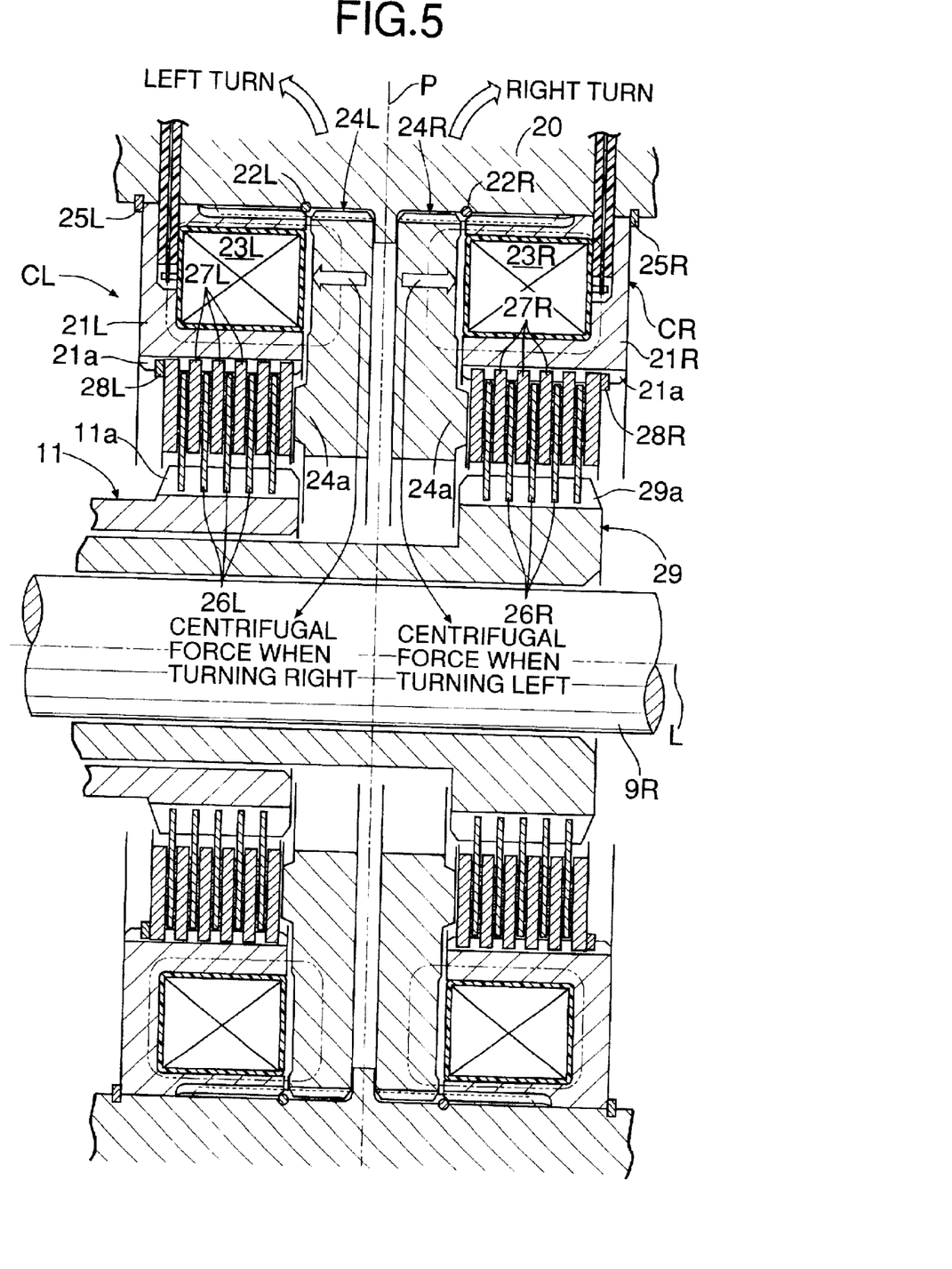
FIG. 5 is a diagram of a second embodiment corresponding to FIG. 2.

Next, a second embodiment of the present invention is explained by reference to FIGS. 5 to 7.

The right and left electromagnetic clutches CR and CL of the first embodiment explained by reference to FIG. 2 have the right and left armatures 24R and 24L arranged on the right and left sides of the common core 21, but right and left electromagnetic clutches CR and CL of the second embodiment illustrated in FIG. 5 have fixed right and left cores 21R and 21L with a space therebetween, and right and left armatures 24R and 24L that are arranged in the space in a laterally movable manner. As a result, when the coil 23L of the left electromagnetic clutch CL is excited, the armature 24L is attracted in the leftward direction toward the core 21L, thus making the clutch plates 27L and the clutch discs 26L come into close contact with each other and thereby connecting the carrier member 11 to the housing 20. When the coil 23R of the right electromagnetic clutch CR is excited, the armature 24R is attracted in the rightward direction toward the core 21R, thus making clutch plates 27R and clutch discs 26R come into close contact with each other and thereby connecting the sleeve 29 to the housing 20.

Figure 6:
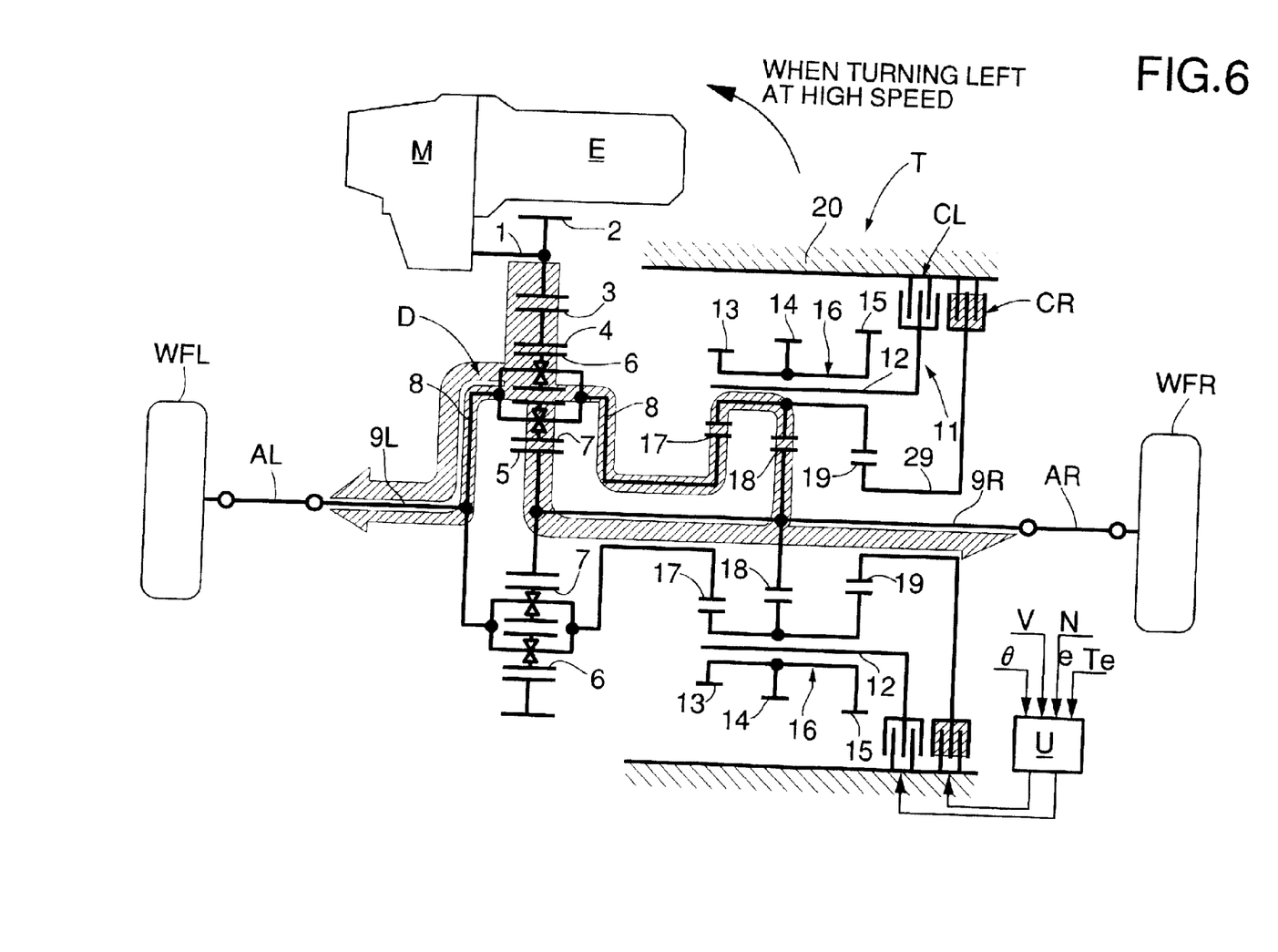
FIG. 6 is a diagram showing the action of the driving force distribution system when the vehicle is turning left at a high speed.

When the vehicle is turning left at a high speed, as shown in FIG. 6 the right electromagnetic clutch CR is engaged in accordance with a command from the electronic control unit U. As a result, the rotational speed NL of the front left wheel WFL is increased relative to the rotational speed NR of the front right wheel WFR, and a proportion of the torque of the front right wheel WFR which is the outer turning wheel can therefore be transmitted to the front left wheel WFL which is the inner turning wheel as shown by the hatched arrows in FIG. 6, thereby stabilizing the vehicle behavior during the turn. When the right electromagnetic clutch CR is engaged, the armature 24R of the right electromagnetic clutch CR is urged rightward, which is to the outside of the turn, due to the centrifugal force caused by turning left. This reduces the air gap between the armature 24R and the core 21R in advance, thereby not only enhancing the responsiveness of engagement of the right electromagnetic clutch CR but also reducing the power consumption.

Also in this case, if, instead of stopping the sleeve 29 by means of the right electromagnetic clutch CR, the rotational speed of the sleeve 29 is reduced by appropriately adjusting the engagement force of the right electromagnetic clutch CR, the rotational speed NL of the front left wheel WFL can be increased relative to the rotational speed NR of the front right wheel WFR in accordance with the reduction, and any required level of torque can be transmitted from the front right wheel WFR, which is the outer turning wheel, to the front left wheel WFL, which is the inner turning wheel.

Figure 7:
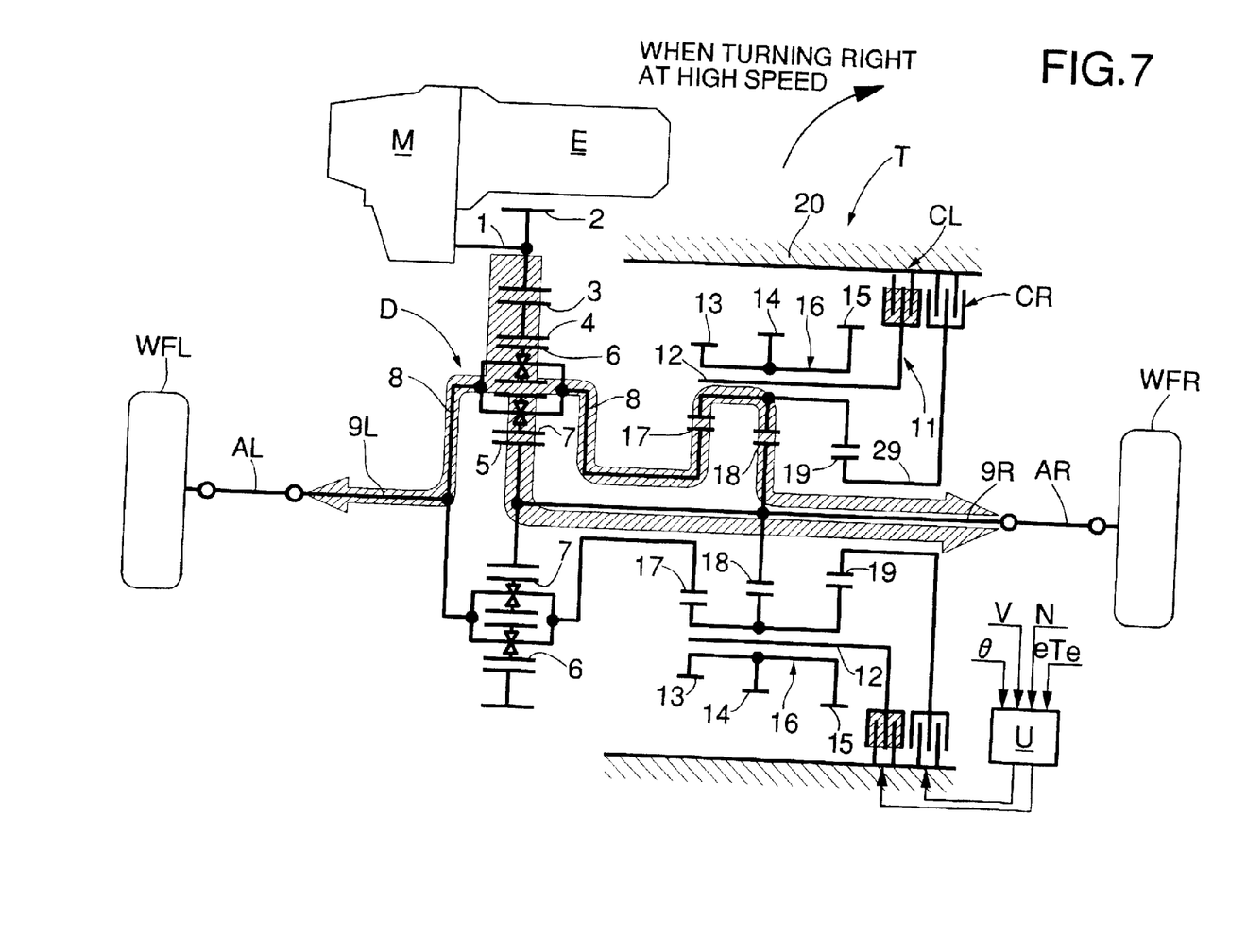
FIG. 7 is a diagram showing the action of the driving force distribution system when the vehicle is turning right at a high speed.

On the other hand, when the vehicle is turning right at a high speed, as shown in FIG. 7 the left electromagnetic clutch CL is engaged in accordance with a command from the electronic control unit U. As a result, the rotational speed NR of the front right wheel WFR is increased relative to the rotational speed NL of the front left wheel WFL, and a proportion of the torque of the front left wheel WFL, which is the outer turning wheel, can therefore be transmitted to the front right wheel WFR, which is the inner turning wheel, as shown by the hatched arrow in FIG. 7, thereby stabilizing the vehicle behavior during the turn. When the left electromagnetic clutch CL is engaged, the armature 24L of the left electromagnetic clutch CL is urged leftward, which is to the outside of the turn, due to the centrifugal force caused by turning right. This reduces the air gap between the armature 24L and the core 21L in advance, thereby not only enhancing the responsiveness of engagement of the left electromagnetic clutch CL but also reducing the power consumption.

Also in this case, if, instead of stopping the carrier member 11 by means of the left electromagnetic clutch CL, the rotational speed of the carrier 11 is reduced by appropriately adjusting the engagement force of the left electromagnetic clutch CL, the rotational speed NR of the front right wheel WFR can be increased relative to the rotational speed NL of the front left wheel WFL in accordance with the reduction, and any required level of torque can be transmitted from the front left wheel WFL, which is the outer turning wheel, to the front right wheel WFR, which is the inner turning wheel.

In the above-mentioned first and second embodiments, the cores 21, 21R and 21L are disposed on the inside, in the radial direction, of the housing 20, and the clutch plates 27R and 27L and the clutch discs 26R and 26L are disposed on the inside, in the radial direction, of the cores 21, 21R and 21L. The above-mentioned arrangement allows the axial dimensions of the right and left electromagnetic clutches CR and CL to be reduced in comparison with a case where the clutch plates 27R and 27L and the clutch discs 26R and 26L are disposed to the right and left, in the axial direction, of the cores 21, 21R and 21L.

Embodiments of the present invention have been described in detail above, but the present invention can be modified in a variety of ways without departing from the spirit and scope of the invention.

For example, the right and left electromagnetic clutches CR and CL in the present embodiments have the clutch plates 27R and 27L and the clutch discs 26R and 26L on the inside, in the radial direction, of the cores 21, 21R and 21L, but clutch plates and clutch discs can be arranged to the right and left, in the axial direction, of the cores.

As hereinbefore described, in accordance with the invention, when a vehicle turns right, the first electromagnetic clutch is engaged so as to assist the turn by transmitting torque from the right driven wheel that is on the inside of the turn to the left driven wheel that is on the outside of the turn. Since the first electromagnetic clutch is provided with the armature on the right side of the core housing the coil, the armature is urged leftward due to a centrifugal force caused by turning right to reduce an air gap, thereby enhancing the responsiveness of engagement of the first electromagnetic clutch as well as reducing the power consumption. When the vehicle turns left, the second electromagnetic clutch is engaged so as to assist the turn by transmitting torque from the left driven wheel that is on the inside of the turn to the right driven wheel that is on the outside of the turn. Since the second electromagnetic clutch is provided with the armature on the left side of the core housing the coil, the armature is urged rightward due to a centrifugal force caused by turning left to reduce an air gap, thereby enhancing the responsiveness of engagement of the second electromagnetic clutch as well as reducing the power consumption.

Furthermore, in accordance with the invention, when a vehicle turns right, the second electromagnetic clutch is engaged so as to stabilize the vehicle behavior by transmitting torque from the left driven wheel that is on the outside of the turn to the right driven wheel that is on the inside of the turn. Since the second electromagnetic clutch is provided with the armature on the right side of the core housing the coil, the armature is urged leftward due to a centrifugal force caused by turning right to reduce an air gap, there by enhancing the responsiveness of engagement of the second electromagnetic clutch as well as reducing the power consumption. When the vehicle turns left, the first electromagnetic clutch is engaged so as to stabilize the vehicle behavior by transmitting torque from the right driven wheel that is on the outside of the turn to the left driven wheel that is on the inside of the turn. Since the first electromagnetic clutch is provided with the armature on the left side of the core housing the coil, the armature is pushed rightward due to a centrifugal force caused by turning left to reduce an air gap, there by enhancing the responsiveness of engagement of the first electromagnetic clutch as well as reducing the power consumption.

What is claimed is:

1. An electromagnetic clutch structure for use in a driving force distribution system comprising:
    a first electromagnetic clutch for transmitting torque from a right output shaft connected to a right driven wheel to a left output shaft connected to a left driven wheel; and
    a second electromagnetic clutch for transmitting torque from the left output shaft connected to the left driven wheel to the right output shaft connected to the right driven wheel, wherein the selective operation of the first and second electromagnetic clutches transmits torque from the output shaft on the inside of a turn to the output shaft on the outside of the turn;
    a core housing a first coil and a second coil;
    wherein the first electromagnetic clutch comprises a first armature placed on the right side of the core housing the first coil; and
    wherein the second electromagnetic clutch comprises a second armature placed on the left side of the core housing the second coil.

2. The electromagnetic clutch structure of claim 1, wherein the structure is provided within a housing in a vehicle.

3. The electromagnetic clutch structure of claim 2, further comprising a controller for controlling engagement of the first electromagnetic clutch and the second electromagnetic clutch.

4. The electromagnetic clutch structure of claim 3, wherein when the vehicle turns right, the first electromagnetic clutch is engaged and the first armature is urged leftward thereby reducing an air gap between the first armature and the core.

5. The electromagnetic clutch structure of claim 3, wherein when the vehicle turns right, the first electromagnetic clutch is engaged and the first armature is urged leftward thereby reducing power consumption of the first electromagnetic clutch.

6. The electromagnetic clutch structure of claim 3, wherein when the vehicle turns left, the second electromagnetic clutch is engaged and the second armature is urged rightward thereby reducing an air gap between the second armature and the core.

7. The electromagnetic clutch structure of claim 3, wherein when the vehicle turns left, the second electromagnetic clutch is engaged and the second armature is urged rightward thereby reducing power consumption of the second electromagnetic clutch.

8. The electromagnetic clutch structure of claim 2, further comprising a carrier member connected to the housing.

9. The electromagnetic clutch structure of claim 8, wherein a rotational speed of the carrier member is increased relative to a rotational speed of the right output shaft.

10. The electromagnetic clutch structure of claim 1, wherein a rotational speed of the left driven wheel is increased relative to a rotational speed of the right driven wheel such that when the vehicle is turning right, the following equation is satisfied: rotational speed of left driven wheel/rotational speed of right driven wheel is approximately 1.167.

11. The electromagnetic clutch structure of claim 8, wherein when the vehicle turns left, a rotational speed of the carrier member is reduced and wherein a rotational speed of the right driven wheel is increased relative to a rotational speed of the left driven wheel such that the following equation is satisfied: rotational speed of right driven wheel/rotational speed of left driven wheel is approximately 1.143.

12. An electromagnetic clutch structure for use in a driving force distribution system comprising:
    a first electromagnetic clutch having a first coil and transmitting torque from a right output shaft connected to a right driven wheel to a left output shaft connected to a left driven wheel; and
    a second electromagnetic clutch having a second coil and transmitting torque from the left output shaft connected to the left driven wheel to the right output shaft connected to the right driven wheel, wherein the selective operation of the first and second electromagnetic clutches transmits torque between the output shaft on the inside of a turn and the output shaft on the outside of the turn;
    wherein, among the first electromagnetic clutch and the second electromagnetic clutch, the electromagnetic clutch operated when turning right comprises an armature placed on the right side of the respective coil, and the electromagnetic clutch operated when turning left the vehicle comprises an armature placed on the left side of the respective coil.

* * * * *